United States Patent
Jackson et al.

(10) Patent No.: US 11,046,232 B2
(45) Date of Patent: Jun. 29, 2021

(54) ANTI-CHILD TETHER HOOK CARGO TIE-DOWN

(71) Applicant: Honda Motor Co., Ltd., Tokyo (JP)

(72) Inventors: Donald W. Jackson, Zanesfield, OH (US); Larry G. Hughes, Jr., Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 16/223,635

(22) Filed: Dec. 18, 2018

(65) Prior Publication Data

US 2020/0189443 A1 Jun. 18, 2020

(51) Int. Cl.
*B60P 7/08* (2006.01)
*B60N 2/28* (2006.01)

(52) U.S. Cl.
CPC .......... *B60P 7/0807* (2013.01); *B60N 2/2809* (2013.01)

(58) Field of Classification Search
CPC ..... B60P 7/0807; B60P 7/0823; B60P 7/0815; B60P 3/07; B60P 3/40; B60P 7/06; B60P 7/0876; B60P 7/0892; B60P 3/20
USPC ... 410/101, 106, 102, 116, 97, 104, 100, 96, 410/90, 84, 81, 77; 248/499, 500, 503.1, 248/231.9, 419, 424; 296/43, 186.5, 296/216.04, 222, 40
See application file for complete search history.

(56) References Cited

U.S. PATENT DOCUMENTS

| | | | |
|---|---|---|---|
| 2,623,477 A | 7/1951 | Tuttle | |
| 4,681,367 A * | 7/1987 | Timmers | B60N 2/3081 297/188.1 |
| 4,991,271 A | 2/1991 | Bauer et al. | |
| 5,290,090 A * | 3/1994 | Bell | B60N 2/36 297/238 |
| 6,430,797 B1 * | 8/2002 | Dittmar | B25B 9/00 29/270 |
| 6,666,504 B2 | 12/2003 | Guanzon et al. | |
| 7,021,245 B2 * | 4/2006 | Johnson | B60N 2/2809 119/786 |
| 8,985,664 B2 | 3/2015 | Bermes | |
| 10,040,388 B1 | 8/2018 | Begyn | |
| 10,093,220 B2 | 10/2018 | Dellock et al. | |
| 2007/0140806 A1 * | 6/2007 | Mohan | B60P 7/0823 410/101 |
| 2014/0255121 A1 * | 9/2014 | Pauluk | B60P 7/0807 410/101 |

(Continued)

FOREIGN PATENT DOCUMENTS

EP 2169259 3/2010

*Primary Examiner* — D Glenn Dayoan
*Assistant Examiner* — Sunsurraye Westbrook
(74) *Attorney, Agent, or Firm* — Mark E. Duell; Rankin Hill & Clark LLP

(57) ABSTRACT

A cargo tie-down for installation on a vehicle body is provided. The vehicle body includes a rear seat and a child restraint tether anchorage located rearward of the rear seat for attachment of an associated child restraint tether hook provided as part of an associated child restraint for securing the associated child restraint on the rear seat. The cargo tie-down includes a base having a mounting bracket configured for attachment to the vehicle body, a cover member rotatably mounted to the base for covering the base, and a hook main body rotatably mounted to the base. The hook-main body is configured to prevent the associated child restraint tether hook from being secured to the cargo tie-down.

20 Claims, 5 Drawing Sheets

(56) References Cited

U.S. PATENT DOCUMENTS

2017/0236395 A1\* 8/2017 Cech ................ B60N 2/002
                                                    340/449
2017/0259726 A1   9/2017 Milby \* cited by examiner

ANTI-CHILD TETHER HOOK CARGO TIE-DOWN

BACKGROUND

A typical procedure for installing a child restraint (i.e., a child seat) includes fastening a vehicle seat belt through structure of the child restraint and connecting a tether strap from the top of the child restraint to a tether anchorage securely installed in the vehicle. The requirements for child restraint systems used in motor vehicles is specified in 49 CFR § 571.213-Standard No. 213; Child restraint systems. As set forth therein, each child restraint system that has components for attaching the system to a tether anchorage shall include a tether hook that conforms to the configuration and geometry specified in FIG. 11 of the Standard. FIG. 11 of the Standard specifies that the hook end portion shall be 10 mm to 12 mm in width. One known problem with the installation of a child restraint system is that an operator may inadvertently secure the tether hook to a cargo tie-down instead of the proper tether anchorage.

BRIEF DESCRIPTION

According to one aspect, a cargo tie-down for installation on a vehicle body is provided. The vehicle body includes a rear seat and a child restraint tether anchorage located rearward of the rear seat for attachment of an associated child restraint tether hook provided as part of an associated child restraint for securing the associated child restraint on the rear seat. The cargo tie-down comprises a base having a mounting bracket configured for attachment to the vehicle body, a cover member rotatably mounted to the base for covering the base, and a hook main body rotatably mounted to the base. The hook-main body is configured to prevent the associated child restraint tether hook from being secured to the cargo tie-down.

According to another aspect, a vehicle assembly comprises a rear seat, a child restraint tether anchorage located rearward of the rear seat for attachment of an associated child restraint tether hook provided as part of an associated child restraint for securing the associated child restraint on the rear seat, and a cargo tie-down separate from the child restraint tether anchorage. The cargo tie-down includes a hook main body configured to prevent the associated child restraint tether hook from being secured to the cargo tie-down.

According to another aspect, a cargo tie-down for installation on a vehicle body is provided. The vehicle body includes a rear seat and a child restraint tether anchorage located rearward of the rear seat for attachment of an associated child restraint tether hook provided as part of an associated child restraint for securing the associated child restraint on the rear seat. The cargo tie-down comprises a base having a mounting bracket configured for attachment to the vehicle body, a cover member rotatably mounted to the base for covering the base, and a hook main body rotatably mounted to the base. The hook-main body includes at least one opening sized smaller than a required minimum width dimension of the associated child restraint tether hook. The smaller sized at least one opening prevents attachment of the associated child restraint tether hook to the hook main body.

DETAILED DESCRIPTION

Figure 1:
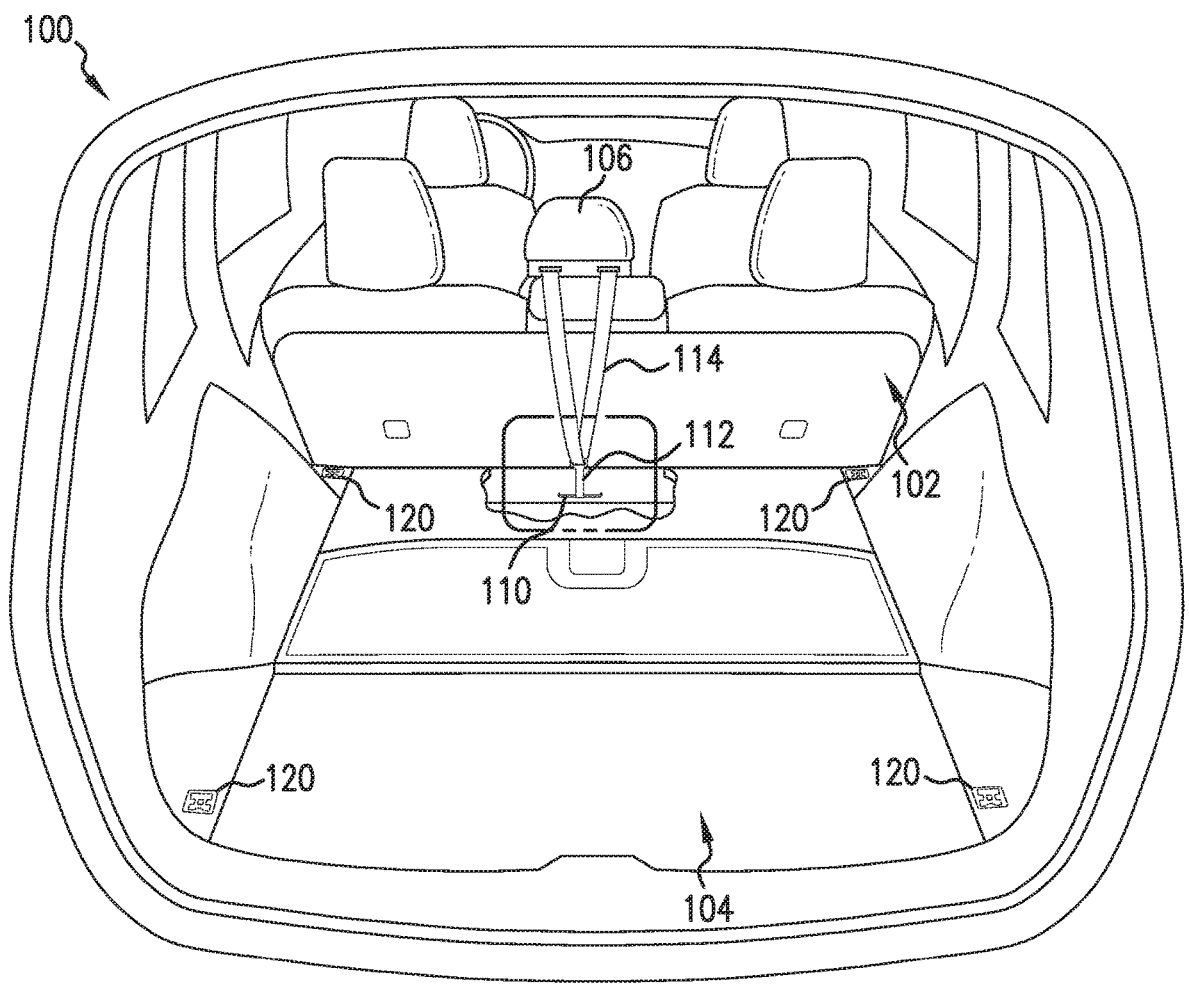
FIG. 1 is a schematic view of a rear part of a vehicle illustrating a rear seat and a load carrying rear floor, and a child restraint secured to the rear seat.
Figure 2:
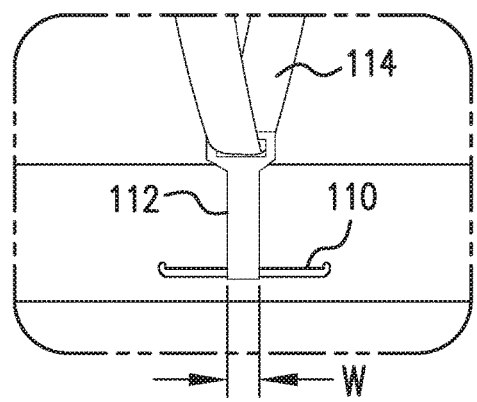
FIG. 2 is an enlarged partial view of FIG. 1 showing the attachment of a child restraint tether hook to a tether anchorage provided on a seat back of the rear seat.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1 and 2 schematically depict a vehicle (or vehicle assembly) 100 including a vehicle body having mounted thereto rear seats 102 and a load carrying rear floor 104 rearward of the rear seats. As is well known, to facilitate securing a child restraint (i.e., a child seat) 106 on the rear seats, at least one tether anchorage 110 is provided at a location relatively behind the rear seats for attachment of a tether hook 112 provided on an end of a strap 114. Further, at least one exemplary cargo tie-down 120 separate from the child restraint tether anchorage 110 is provided on, for example, the rear floor 104 for supporting and fixing loads within the vehicle. It should be noted that the location for each of the tether anchorage 110 and cargo tie-down 120 is merely being shown to illustrate one possible location for each of these components within the vehicle 100.

As depicted in FIGS. 3-6, the cargo tie-down 120 includes a hook main body 122, a body or base 124, a mounting bracket 126 and a cover member 128. As indicated previously, one known problem with the installation of a child restraint system is that an operator may inadvertently secure the tether hook 112 to a cargo tie-down instead of the proper tether anchorage 110. To prevent this, the hook main body 122 of the exemplary cargo tie-down 120 is configured to prevent the tether hook 112 from being secured to the cargo tie-down in a normal manner (meaning without the use of excessive force on one or both of the tether hook 112 and cargo tie-down 120). The hook main body 122 includes at least one opening sized smaller than the required minimum 10 mm width dimension W of the tether hook 112 (see FIG. 2), and the smaller sized at least one opening prevents attachment of the tether hook 112 to the hook main body 122. In the depicted embodiment, the hook main body 122 includes opposed side portions 136, 138 and opposed end portions 140, 142. As will be described below, the end portion 140 is connected to the base 124 and, therefore will be referred to as a connected end portion 140, and the other end portion 142 will be referred to as a free end portion 142. The at least one opening includes first and second openings 146, 148 which are aligned in a width direction of the hook main body 122. The first opening 146 is provided at one of the side portions 136, 138 (i.e., side portion 136) and the second opening 148 is spaced inwardly from each side portion 136, 138 or is provided at the other of the side portions. As shown, the second opening 148 is provided at the other side portion (i.e., side portion 138). Each of the first and second openings 146, 148 defines a cutout in the respective side portion 136, 138. The hook main body 122 can further include a third opening 150 interposed between the first and second openings 146, 148. The opening 150 can be centrally located on the hook main body 122, and as depicted, can be aligned with the openings 146, 148. With the positioning of the openings, the hook main body 122 can be ladder shaped in top plan view. According to the present disclosure, the openings 146, 148, 150 are sized smaller than the required minimum 10 mm width dimension of the tether hook 112. By way of example, the openings 146, 148, 150 have a width dimension W in the range of approximately 9.3 mm to approximately 9.7 mm. The third opening 150 can be square shaped having a length dimension L in the range of approximately 9.3 mm to approximately 9.7 mm. It should be appreciated that the size of the openings 146, 148, 150 still allows for the connection of known attachment devices, for example, bungee cords, to the hook main body 122. It should also be appreciated that the hook main body can include only one of the openings 146, 148 together with the opening 150, or that the hook main body can include only the openings 146, 148.

Figure 3:
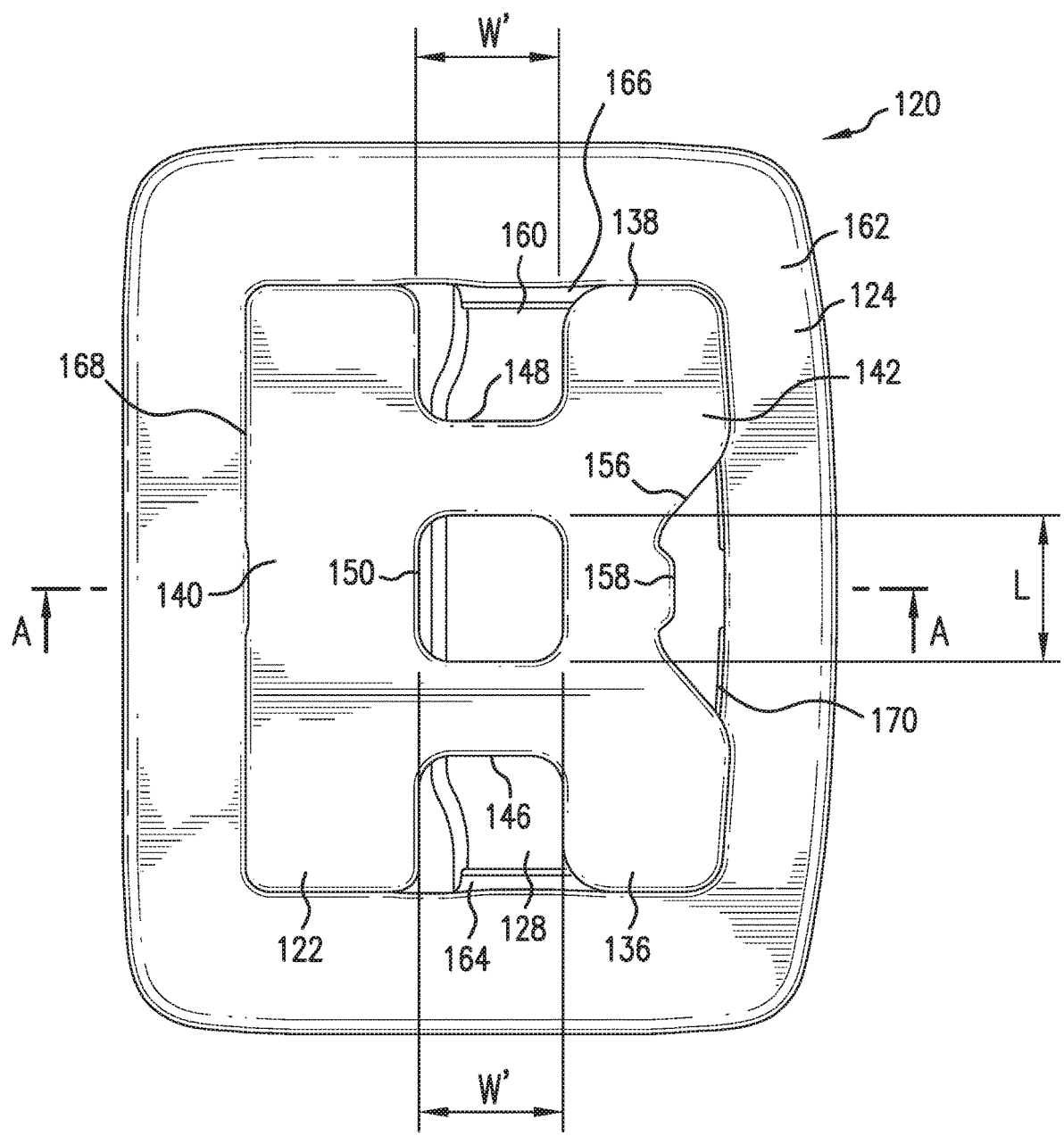
FIG. 3 is a top plan view of an exemplary cargo tie-down to be mounted within the vehicle according to the present disclosure.
Figure 4:
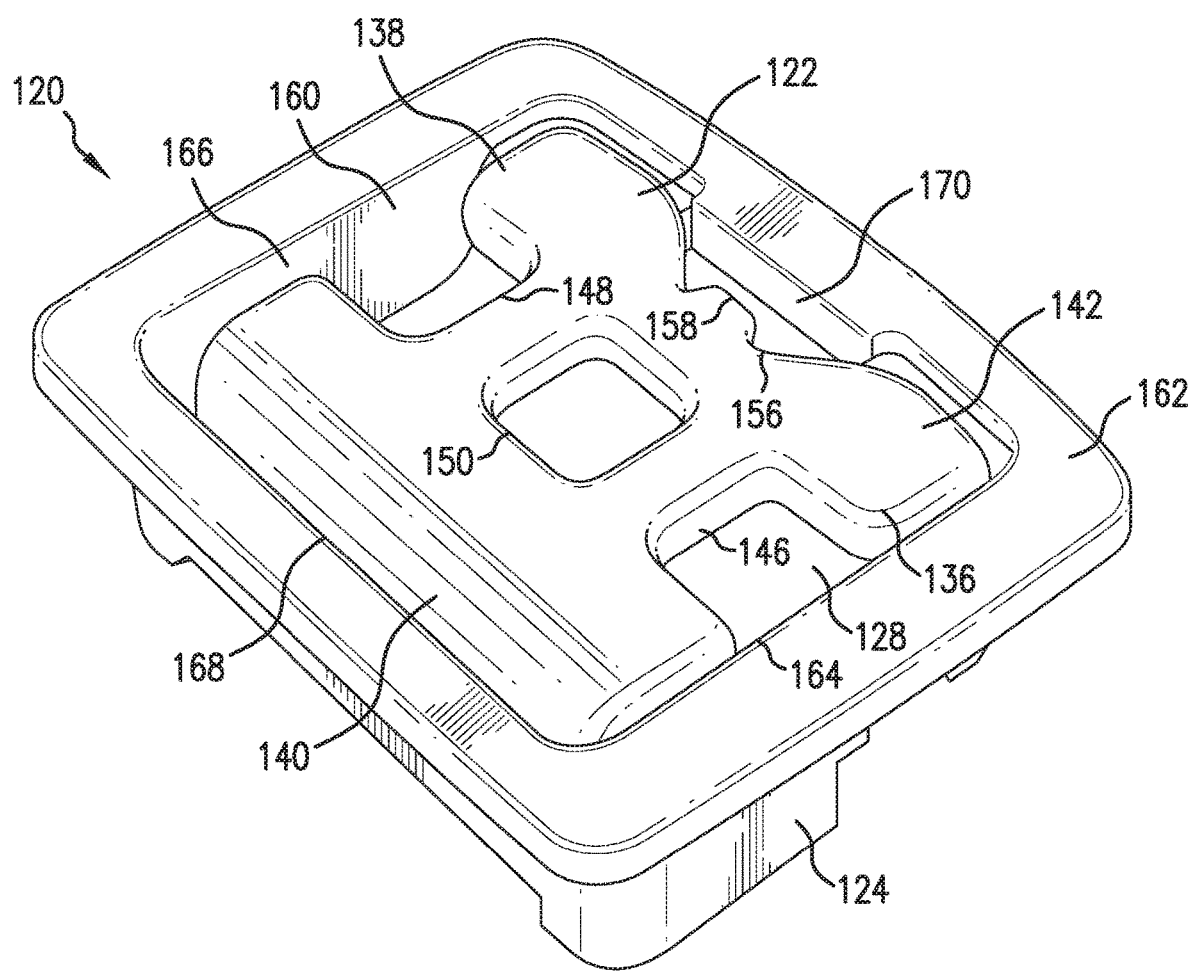
FIG. 4 is a perspective view of the cargo tie-down with its hook main body in a closed position.
Figure 5:
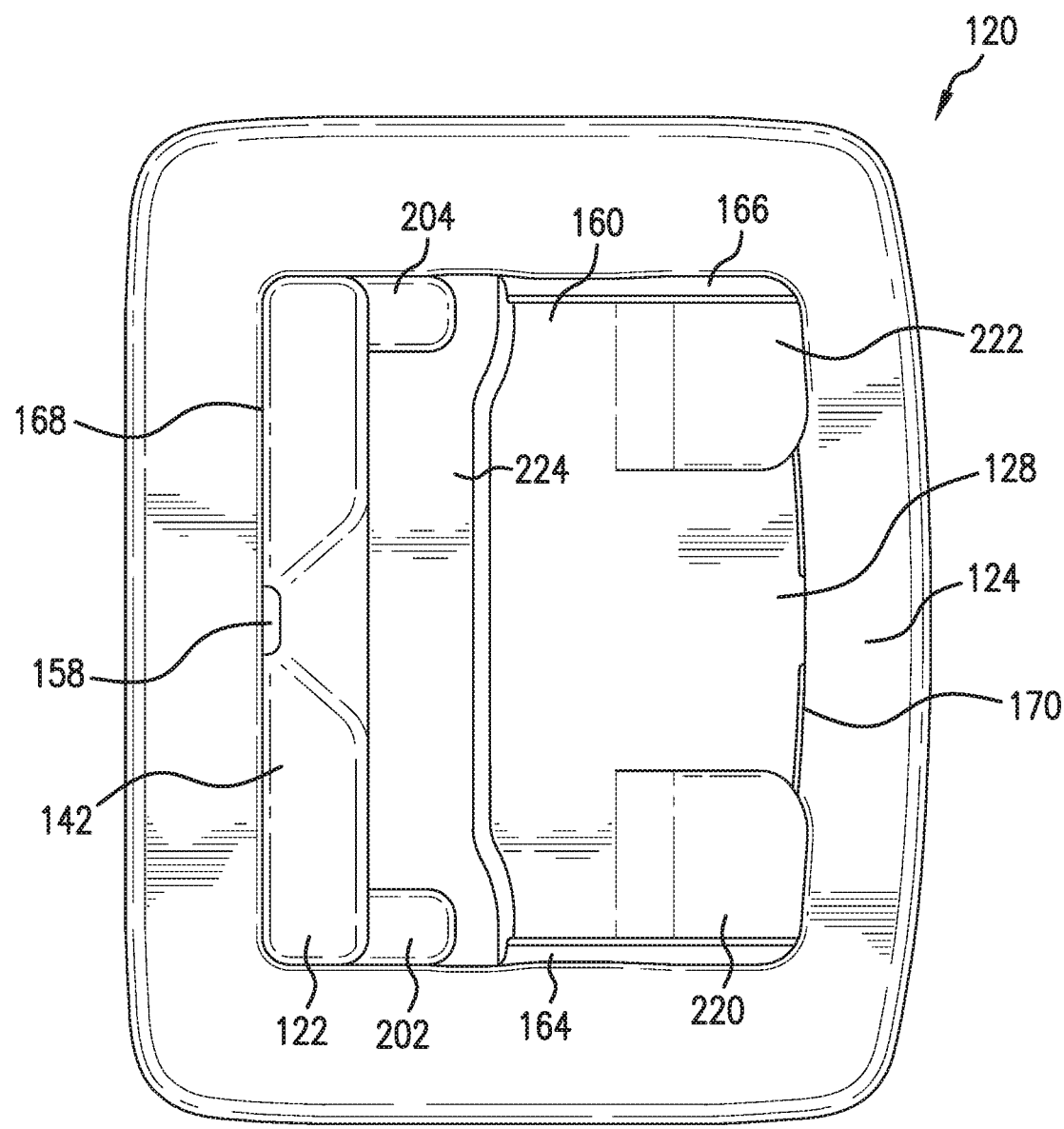
FIG. 5 is a top plan view of the cargo tie-down with its hook main body in an opened position.

Further depicted in FIG. 3-5, according to one aspect, a recessed section 156 is provided in the free end portion 142, and as shown, the recessed section 156 can be centrally located between the side portions 136, 138. A finger grip tab 158 extends into the recessed section 156, and is offset in the width dimension from an edge of the free end portion 142. It should be appreciated that the depicted arrangement of the recessed section 156 and finger grip tab 158 allows a user to easily engage and rotate the hook main body 122 from its closed position to its opened position.

The base 124 is adapted to rotatably hold the hook main body 122 and store the hook main body 122 in its closed position. The base 124 includes a recessed portion 160 for housing the hook main body 122 and a flange portion 162 formed over an entire periphery edge of the recessed portion 160. As shown in FIGS. 3-6, the recessed portion 160, which is formed in a substantially rectangular shape slightly larger than the outer shape of the hook main body 122 in top plan view, is constituted by opposed side walls 164, 166 and opposed end walls 168, 170. The mounting bracket 126, which can be separate from the base 124, defines a bottom surface of the base, wherein the side walls 164, 166 and end walls 168, 170 extend in a substantially vertical direction from the mounting bracket 126. Further depicted, a positioning pin 178, which can be formed integral with the base 124, extends through an opening 180 located in the mounting bracket 126. A compressible washer 182 (e.g., a foam washer) can be mounted on the positioning pin 172 to reduce noise and vibrations between the cargo tie-down 120 and the rear floor 104. The mounting bracket 126 is configured to be supported and fixed to the rear floor 104. In the depicted aspect, the mounting bracket 126 is configured as a substantially plate-shaped bolt attachment portion and includes at least one locking projection (not shown) for securing the mounting bracket 126 in the recessed portion 160. The mounting bracket 126 includes a through hole 186 for exposing a head portion of a bolt 188. When attaching the cargo tie-down 120 to the rear floor 104, for example, it can be easily attached by screwing the bolt 188 to a weld nut (not shown) provided in advance in the rear floor 104.

Figure 6:
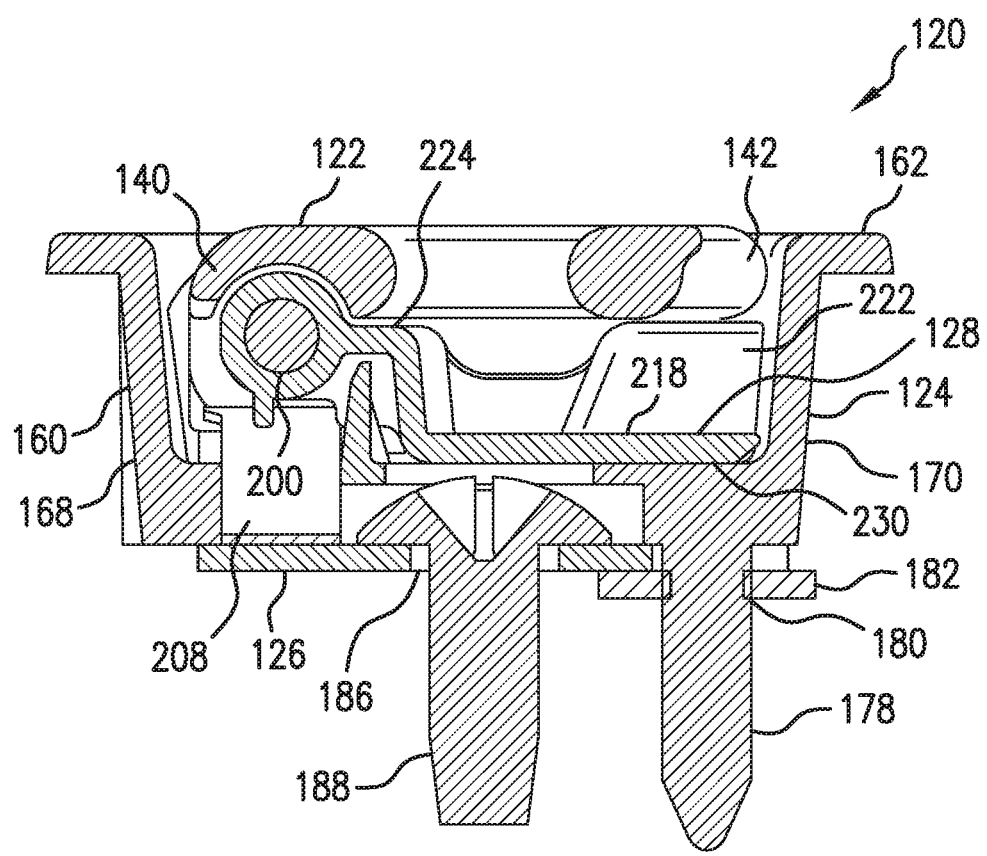
FIG. 6 is a cross-sectional view of the cargo tie-down taken along line A-A of FIG. 3.

With continued reference to FIG. 6, the base 124 includes a rotation shaft 200 which is rotationally secured to the side walls 164, 166 of the recessed portion 160. The rotation shaft 200 rotatably supports the hook main body 122. To this end, the connected end portion 140 of the hook main body 122 includes, for example, hub portions 202, 204 through which the rotation shaft 200 is inserted (see FIG. 5). The hub portions can be continuously provided at both ends of the connected end portion 140. A spring 208 is housed in the base 124 and is adapted to move the hook main body 122 between its closed position and opened position.

The cover member 128 for covering the mounting bracket 126 is rotationally attached to the rotation shaft 200 inside of the hook main body 122 (i.e., the cover member 128 is disposed between the hook main body 122 and the mounting bracket 126). The cover member 128 includes a bottom portion 218 having a substantially rectangular shape in top plan view, and side platforms 220, 222 and an end platform 224 are provided on the bottom portion 218. The side platforms 220, 222 serve as supports for the hook main body 122 in its closed position and are sized so that the hook main body 122 and the flange portion 162 are substantially flush with each other in the closed position. The end platform 224 is fitted between the hub portions 202, 204 of the hook main body 122 and is adapted to receive the rotation shaft 200. Therefore, the cover member 128 can rotate between an opened position where the bolt 188 is exposed and a closed position. In the closed position of the cover member 128, the bottom portion 218 is supported on inwardly extending ledge 230 of the recessed portion 160. Further, a locking projection (not shown) can be formed on the cover member 128 and can be received in a lock opening (not shown) formed in one of the side walls 164, 166 of the recessed portion 160, whereby the cover member 128 can be securely locked to the recessed portion 160.

Accordingly, the present disclosure provides a cargo tie-down 120 for installation on a vehicle body. The vehicle body includes a rear seat 102 and a child restraint tether anchorage 110 located rearward of the rear seat for attachment of a child restraint tether hook 112 provided as part of a child restraint 106 for securing the child restraint on the rear seat 102. The cargo tie-down 120 includes a base 124 having a mounting bracket 126 configured for attachment to the vehicle body, a cover member 128 rotatably mounted to the base 124 for covering the base, and a hook main body 122 rotatably mounted to the base. The hook main body 122 is configured to prevent the child restraint tether hook 112 from being secured to the cargo tie-down 120.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A cargo tie-down for installation on a vehicle body, the vehicle body including a rear seat and a child restraint tether anchorage located rearward of the rear seat for attachment of an associated child restraint tether hook provided as part of an associated child restraint for securing the associated child restraint on the rear seat, the cargo tie-down comprising:
   a base having a mounting bracket configured for attachment to the vehicle body;
   a cover member rotatably mounted to the base for covering the base; and
   a hook main body rotatably mounted to the base, the hook-main body is configured to prevent the associated child restraint tether hook from being secured to the cargo tie-down.

2. The cargo tie-down of claim 1, wherein the hook main body includes at least one opening sized smaller than a required minimum width dimension of the associated child restraint tether hook, wherein the smaller sized at least one opening prevents attachment of the associated child restraint tether hook to the hook main body.

3. The cargo tie-down of claim 2, wherein the at least one opening of the hook main body includes a first opening and a second opening aligned with the first opening in a width direction of the hook main body.

4. The cargo tie-down of claim 3, wherein the hook main body includes opposed side portions, a connected end portion mounted to the base, and a free end portion opposed to the connected end portion, wherein the first opening is provided at one of the side portions, and the second opening is spaced inwardly from each side portion or is provided at the other of the side portions.

5. The cargo tie-down of claim 4, wherein the hook main body includes a third opening provided at the other of the side portions, the third opening is aligned with the first opening in the width direction of the hook main body, and the second opening is interposed between the first and third openings.

6. The cargo tie-down of claim 5, wherein each of the first and third openings defines a cutout in the respective side portion.

7. The cargo tie-down of claim 5, wherein the hook main body is ladder shaped in top plan view.

8. The cargo tie-down of claim 3, wherein a recessed section is provided in the free end portion of the hook main body, and a finger grip tab extends into the recessed section.

9. The cargo tie-down of claim 3, wherein each of the first and second openings has a width dimension less than 10 mm.

10. The cargo tie-down of claim 9, wherein the second opening is centrally located on the hook main body and has a length dimension less than 10 mm.

11. A vehicle assembly comprising:
a rear seat mounted to a vehicle body;
a child restraint tether anchorage located rearward of the rear seat for attachment of an associated child restraint tether hook provided as part of an associated child restraint for securing the associated child restraint on the rear seat; and
a cargo tie-down separate from the child restraint tether anchorage, the cargo tie-down attached to the vehicle body and including a rotatable hook main body configured to prevent the associated child restraint tether hook from being secured to the cargo tie-down.

12. The vehicle assembly of claim 11, wherein the hook main body includes at least one opening sized smaller than a required minimum width dimension of the associated child restraint tether hook, wherein the smaller sized at least one opening prevents attachment of the associated child restraint tether hook to the hook main body.

13. The vehicle assembly of claim 12, wherein the at least one opening has a width dimension less than 10 mm.

14. The vehicle assembly of claim 12, wherein the at least one opening of the hook main body includes a first opening and a second opening aligned with the first opening in a width direction of the hook main body.

15. The vehicle assembly of claim 14, wherein the hook main body includes opposed side portions and opposed end portions, wherein the first opening is provided at one of the side portions, and the second opening is spaced inwardly from each side portion or is provided at the other of the side portions.

16. The vehicle assembly of claim 15, wherein the hook main body includes a third opening provided at the other of the side portions, wherein the third opening is aligned with the first opening in the width direction of the hook main body.

17. The vehicle assembly of claim 15, wherein a recessed section is provided in one of the end portions of the hook main body, and a finger grip tab extends into the recessed section.

18. A cargo tie-down for installation on a vehicle body, the vehicle body including a rear seat and a child restraint tether anchorage located rearward of the rear seat for attachment of an associated child restraint tether hook provided as part of an associated child restraint for securing the associated child restraint on the rear seat, the cargo tie-down comprising:
a base having a mounting bracket configured for attachment to the vehicle body;
a cover member rotatably mounted to the base for covering the base; and
a hook main body rotatably mounted to the base, the hook-main body includes at least one opening sized smaller than a required minimum width dimension of the associated child restraint tether hook, wherein the smaller sized at least one opening prevents attachment of the associated child restraint tether hook to the hook main body.

19. The cargo tie-down of claim 18, wherein the at least one opening has a width dimension less than 10 mm.

20. The cargo tie-down of claim 18, wherein an end portion of the hook main body includes a recessed section, and a finger grip tab extends into the recessed section.

* * * * *